United States Patent
Voor et al.

(10) Patent No.: US 10,089,251 B2
(45) Date of Patent: Oct. 2, 2018

(54) MULTI-MODAL ACTIVE CABLE FOR PERFORMING A MODE IDENTIFICATION OPERATION

(71) Applicant: Dell Products L.P., Round Rock, TX (US)

(72) Inventors: Thomas E. Voor, Cedar Park, TX (US); Sean P. O'Neal, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 15/048,041

(22) Filed: Feb. 19, 2016

(65) Prior Publication Data
US 2017/0242804 A1 Aug. 24, 2017

(51) Int. Cl.
G06F 13/38 (2006.01)
G06F 13/10 (2006.01)
G06F 13/42 (2006.01)
G06F 3/023 (2006.01)

(52) U.S. Cl.
CPC ............ *G06F 13/102* (2013.01); *G06F 3/023* (2013.01); *G06F 13/385* (2013.01); *G06F 13/4282* (2013.01)

(58) Field of Classification Search
USPC .................... 710/62–64, 72, 300–304, 73
See application file for complete search history.

(56) References Cited

U.S. PATENT DOCUMENTS

| | | | | |
|---|---|---|---|---|
| 9,798,689 B2* | 10/2017 | Hundal | ................ | G06F 13/385 |
| 2015/0212497 A1* | 7/2015 | Dunstan | ................... | G06F 1/26 |
| | | | | 307/130 |
| 2016/0110305 A1* | 4/2016 | Hundal | ............... | G06F 13/4022 |
| | | | | 710/316 |
| 2016/0125838 A1* | 5/2016 | Hundal | ................. | G09G 5/006 |
| | | | | 345/520 |
| 2016/0156137 A1* | 6/2016 | Pan | ....................... | G06F 13/385 |
| | | | | 439/78 |
| 2017/0017595 A1* | 1/2017 | Schnell | ................ | G06F 13/385 |

* cited by examiner

*Primary Examiner* — Raymond Phan
(74) *Attorney, Agent, or Firm* — Terrile, Cannatti, Chambers & Holland, LLP; Stephen A. Terrile

(57) ABSTRACT

A system and method for providing a multi-modal active cable. In certain embodiments, the multi-modal active cable enables transmission of alternative display information from a source system. More specifically, in certain embodiments, the multi-modal active cable comprises a switching component to allow host system integrated I/O signals to be provided as either I/O adapter integrated I/O signals or dedicated display signals via a single multi-modal active cable. In certain embodiments, the integrated I/O signals comprise Thunderbolt I/O signals. In certain embodiments, the dedicated display signals comprise DisplayPort signals. In certain embodiments the switching component comprises at least one radio frequency (RF) microwave high performance analog switches to switch the high speed digital signals (e.g., signal speeds up to 40 Gbps on each of a plurality of lane). By using such switches, the load capacitance on the signal paths is minimized as the impedance is carefully controlled.

7 Claims, 12 Drawing Sheets

MULTI-MODAL ACTIVE CABLE FOR PERFORMING A MODE IDENTIFICATION OPERATION

BACKGROUND OF THE INVENTION

Field of the Invention

The present invention relates to information handling systems. More specifically, embodiments of the invention relate to a multi-modal active cable.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use active cables to communicate information between a host system to an I/O adapter such as a dock or an input/output (I/O) device such as a display device. One example of systems which use active cables are systems which include a Thunderbolt type integrated I/O controller. For example, a Thunderbolt 3 integrated I/O controller provides a USB Type-C connection to the system. Additionally, the Thunderbolt 3 integrated I/O controller supports a communication bandwidth of up to 40 Gigabits per second and can simultaneously drive two external displays via a DisplayPort type protocol. Such an integrated I/O controller also supports a plurality of other communication protocols including a universal serial bus (USB) Type-C type protocol, a peripheral component interchange express (PCIe) type protocol and a high definition multimedia interface (HDMI) type protocol. Such an integrated I/O controller also enables implementation of USB Power Delivery, allowing ports coupled to the integrated I/O controller to source or sink up to 100 watts of power.

SUMMARY OF THE INVENTION

A system and method are disclosed for providing a multi-modal active cable. In certain embodiments, the multi-modal active cable enables transmission of alternative display information from a source system. More specifically, in certain embodiments, the multi-modal active cable comprises a switching component to allow host system integrated I/O signals to be provided as either I/O adapter integrated I/O signals or dedicated display signals via a single multi-modal active cable. In certain embodiments, the integrated I/O signals comprise Thunderbolt I/O signals. In certain embodiments, the dedicated display signals comprise DisplayPort signals. In certain embodiments the switching component comprises at least one radio frequency (RF) microwave high performance analog switches to switch the high speed digital signals (e.g., signal speeds up to 40 Gbps on each of a plurality of lane). By using such switches, the load capacitance on the signal paths is minimized as the impedance is carefully controlled.

In another embodiment, the multi-modal active cable comprises a mode identification feature which enables identification of the mode of operation of the multi-modal active cable. More specifically, in certain embodiments, the multi-modal active cable uses standard USB power delivery on a USB Type-C connector to uniquely identify the capability of the cable to support integrated I/O signals of up to 20 Gbps per lane and two lanes of dedicated display signals as well as USB signals. In certain embodiments, the integrated I/O signals comprise Thunderbolt I/O signals. In certain embodiments, the dedicated display signals comprise DisplayPort signals which include USB signals (also referred to as Display Port Alt Mode, Dock Port, and/or Multi-Function Display Port). In certain embodiments, the USB signals comprise USB 3.1 signals. In certain embodiments, the multi-modal active cable comprises an active cable port controller and the capabilities message is generated via an E-Marker generated by the active cable port controller.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Aspects of the present disclosure appreciate that known Thunderbolt type integrated I/O controllers cannot accept non-integrated I/O video into a Thunderbolt type dock station or display devices. Moreover, known Thunderbolt cables are active with re-drivers to overcome signal losses when they are above a certain length. However, known Thunderbolt devices and cables with re-drivers cannot accept DisplayPort or HDMI video from a source. The frequency required is too high and the bandwidth too wide to allow digital data multiplexor (Mux) switches or stubs that result from many other types of switches.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
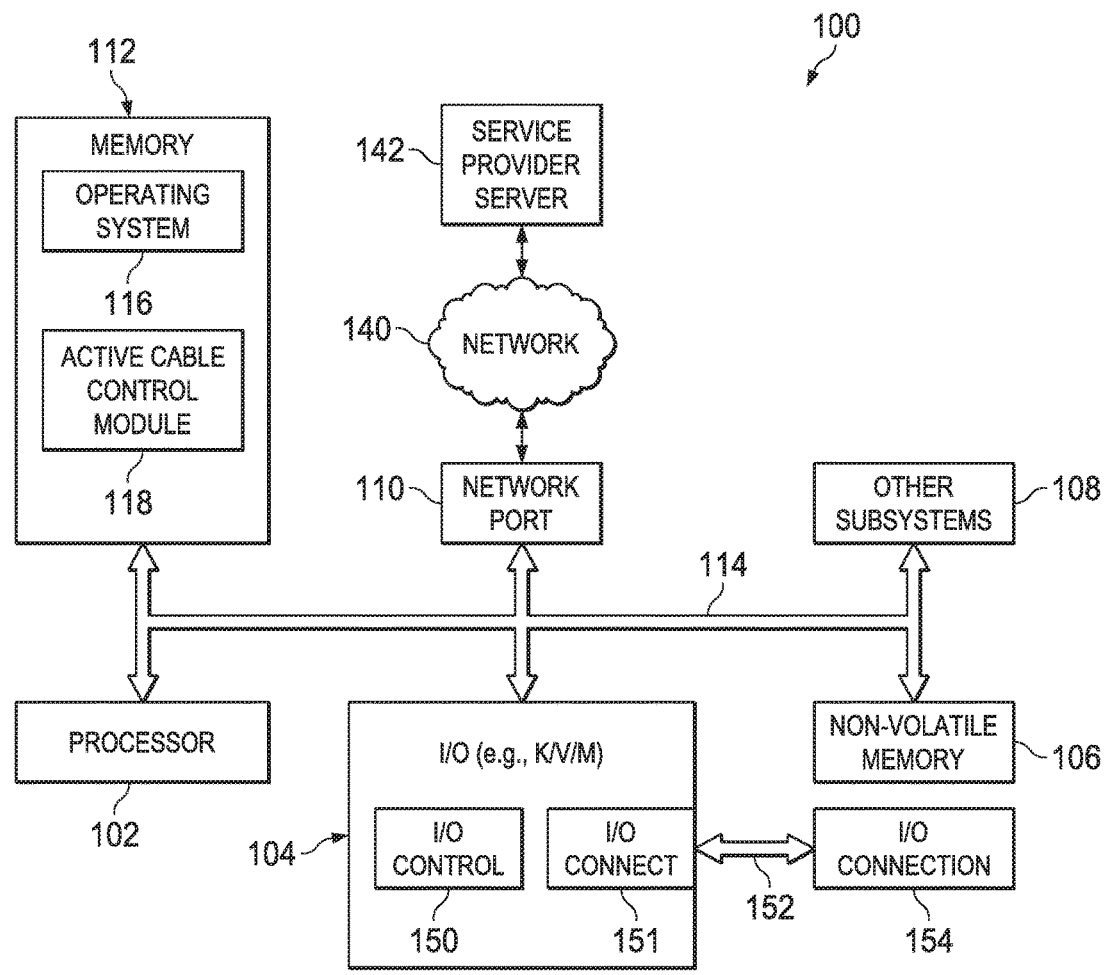
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise active cable control module 118.

Additionally, in various embodiments, I/O devices 104 the information handling system 100 comprise an integrated I/O controller 150 as well as an integrated I/O connector 151. In certain embodiments, the integrated I/O controller 150 comprises a Thunderbolt 3 type integrated I/O controller. In certain embodiments, the integrated I/O connector 151 comprises a USB Type-C connector. A multi-modal active cable 152 may be coupled to the connector 151. Additionally, in certain embodiments the multi-modal active cable 152 may be coupled with an I/O connection device 154 such as a docking station.

In certain embodiments, the multi-modal active cable enables transmission of either alternative display information from a source system, or integrated I/O signals. More specifically, in certain embodiments, the multi-modal active cable comprises a switching component to allow host system integrated I/O signals to be provided as either I/O adapter integrated I/O signals or dedicated display signals via a single multi-modal active cable. In certain embodiments, the integrated I/O signals comprise Thunderbolt I/O signals. In certain embodiments, the dedicated display signals comprise DisplayPort signals. In certain embodiments the switching component comprises at least one radio frequency (RF) microwave high performance analog switches to switch the high speed digital signals (e.g., signal speeds up to 20 Gbps on each of a plurality of lane). By using such switches, the load capacitance on the signal paths is minimized as the impedance is carefully controlled.

In another embodiment, the multi-modal active cable comprises a mode identification feature which enables identification of the mode of operation of the multi-modal active cable. In certain embodiments, the mode of operation may be identified via at least one of a I2C type signal and an identification (ID) type signal. More specifically, in certain embodiments, the multi-modal active cable uses standard USB power delivery on a USB Type-C connector to uniquely identify the capability of the cable to support an integrated I/O signals of up to 20 Gbps per lane and two lanes of dedicated display signals. In certain embodiments, the integrated I/O signals comprise Thunderbolt I/O signals. In certain embodiments, the dedicated display signals comprise DisplayPort signals and USB signals (also referred to as Display Port over USB Type-C, Display Port Alt Mode, Dock Port, and/or Multi-Function Display Port). In certain embodiments, the USB signals comprise USB 3.1 signals. In certain embodiments, the multi-modal active cable comprises an active cable port controller and the capabilities message is generated via an E-Marker generated by the active cable port controller. In certain embodiments, the capabilities message is a response by the cable port controller, to USB Power Delivery enabled host's port controller.

Figure 2:
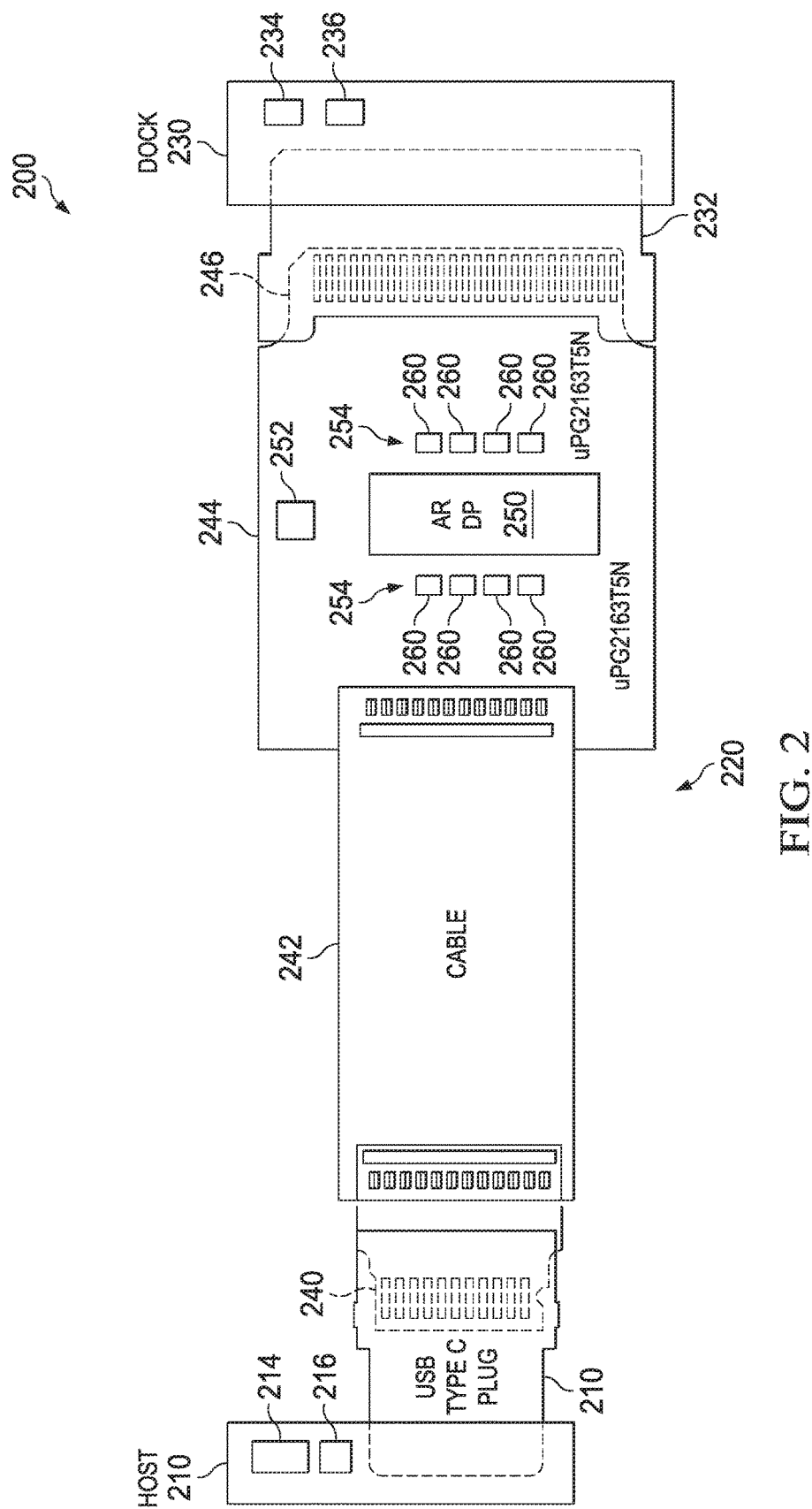
FIG. 2 shows a block diagram of an active cable information handling system environment.

FIG. 2 shows a block diagram of an active cable information handling system environment 200. More specifically, the active cable information handling system environment 200 includes a host system 210 (which in certain embodiments corresponds to information handling system 100) which includes a host system connector 212. In certain embodiments, the host system further includes at least one of an integrated I/O controller 214 and a port controller 216. In certain embodiments, the integrated I/O controller 214 comprises a Thunderbolt 3 type I/O controller available from Intel Corp. under the trade designation Alpine Ridge. In certain embodiments, the port controller 216 comprises a port controller available from Texas Instruments under the trade designation TI TPS65982, or from Cypress Semiconductor under the trade designation EZ-PD CCG1. In certain embodiments, the host system 210 may not include an integrated I/O controller, but instead supports at least one of USB3.1 and Display Port over USB Type-C, or Dock Port, or Display Port Alt Mode.

The active cable information handing system environment 200 also includes a multi-modal active cable 220 (which includes some or all of the functionality of multi-modal active cable 152) as well as a docking station 230, which include a docking station connector 232. In certain embodiments, the docking station 230 further includes at least one of an integrated I/O controller 234 and a port controller 236. In certain embodiments, the integrated I/O controller 234 comprises a Thunderbolt 3 type I/O controller available from Intel Corp. under the trade designation Alpine Ridge. In certain embodiments, the port controller 236 comprises a port controller available from Texas Instruments under the trade designation TI TPS65982, or from Cypress Semiconductor under the trade designation EZ-PD CCG1. It will be appreciated that rather than a docking station, other types of I/O adapters are contemplated. In certain embodiments the docking system may not include an integrated I/O controller, but instead supports at least one of USB3.1 and Display Port over USB Type-C, or Dock Port, or Display Port Alt Mode.

The multi-modal active cable 220 includes a first connector 240, a cable portion 242, an active cable portion 244 and a second connection portion 246. In certain embodiments, the first connector 240 comprises a USB type-C plug which interfaces with the host system connector 212. In certain embodiments, the second connection portion comprises a signal distribution connector which interfaces with the docking station connector 232. In certain embodiments, the signal distribution connector comprises more signal paths than the first connector. In certain embodiments, the signal distribution connector comprises a 56-pin signal distribution connector. In certain embodiments, the signal distribution connector can include a USB Type-C connector. In certain embodiments the active cable portion 244 comprises an integrated I/O controller 250, a port controller 252 and a switching components 254. In certain embodiments, the integrated I/O controller 250 comprises a Thunderbolt 3 type I/O controller available from Intel Corp. under the trade designation Alpine Ridge. In certain embodiments, the integrated I/O controller 250 comprises a Thunderbolt 3 type re-driver available from Intel Corp. under the trade designation Cooper Bridge. In certain embodiments, the port controller 252 comprises a port controller available from Texas Instruments under the trade designation TI TPS65982, or from Cypress Semiconductor under the trade designation EZ-PD CCG1. In certain embodiments, the switching component 254 comprises a plurality of switches 260. In certain embodiments, the switches comprise high speed single pole double throw analog RF switches such as the uPG2163T5N switches developed for wireless local area network (LAN) applications.

Figure 3A:
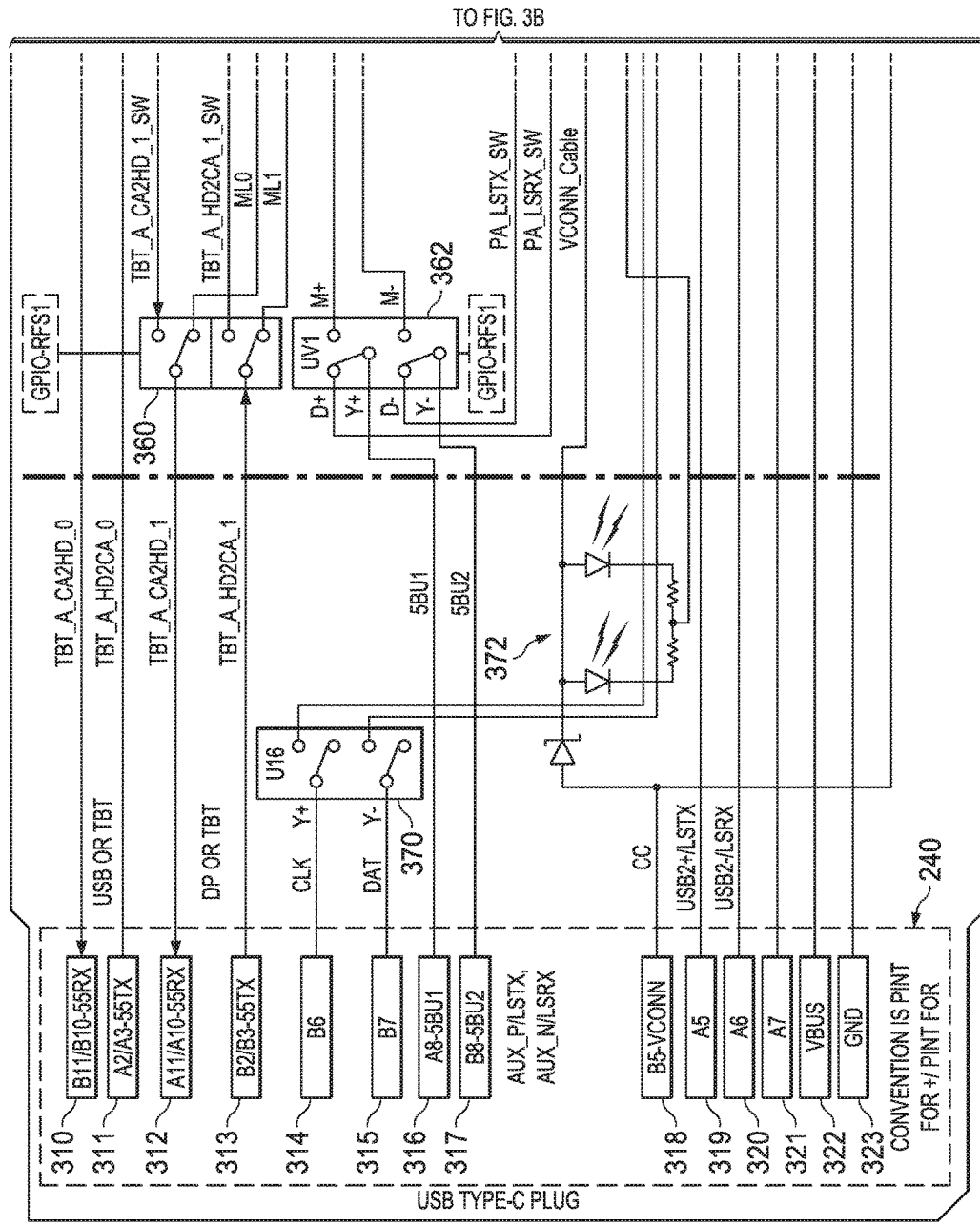
FIGS. 3A and 3B show a schematic block diagram of a multi-modal active cable.
Figure 3B:
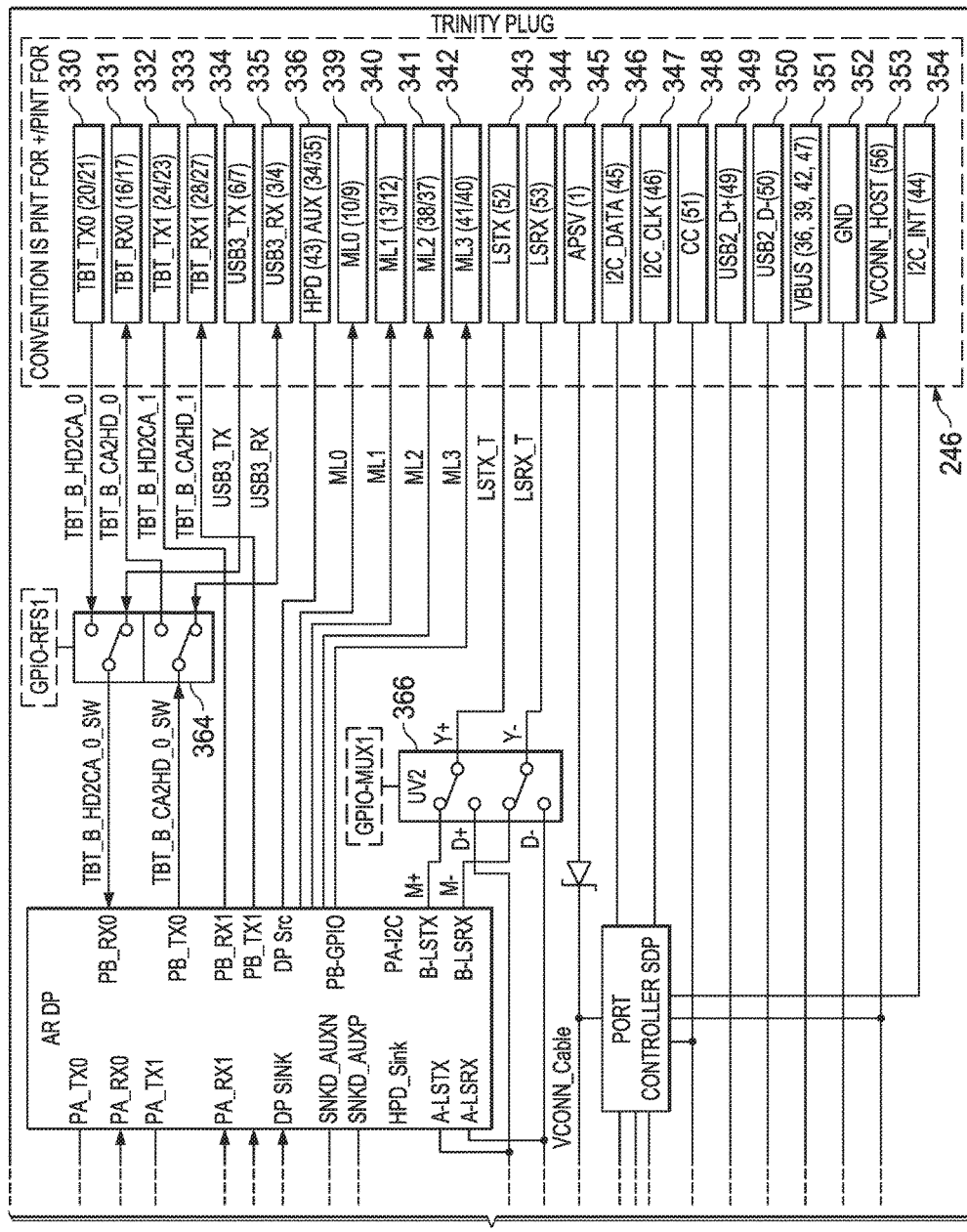

FIG. 3 shows a schematic block diagram of the multi-modal active cable 220. The first connector 240 comprises a first plurality of signal connections. The second connection portion 246 comprises a second plurality of signal connections, the second plurality of signal connections being more numerous than the first plurality of signal connections.

More specifically, the first connector 240 is capable of carrying high speed, and high bandwidth signals including integrated I/O, USB3.1 Gen 1, USB3.1 Gen 2, Thunderbolt 3$^{rd}$ Generation 20 Gbps per lane, and Display Port over USB Type-C, and combinations of USB and Display Port. In certain embodiments, connector 240 is carrying signals including a pair of signal connections for first integrated I/O differential receive signal connections 310 (RX1P and RX1N), and first integrated I/O differential transmit signal connections 311 (TX1P and TX1N), and second integrated I/O differential receive signal connections 312 (RX2P and RX2N), and second integrated I/O differential transmit signal connections 313 (TX2P and TX2N), a pair of sideband auxiliary signal connections 316, 317 (SBU1, SBU2), a first cable power connection 318 (VCON), a configuration channel signal connection 319 (CC), a USB2.0 differential pair signal connections 320, 321 (Dp, Dn on), one or more bus power signal connection 322 (Vbus) and one or more ground signal connection 323 (GND). In certain embodiments, the first connector 240 is designed to be insertion orientation agnostic (i.e., the connector will operationally transmit and receive the correct signals regardless of the orientation of the connector).

In certain embodiments, the first connector comprises a USB3.1 Type-C connector. In these embodiments, signal connections 310 correspond to pins B11 and B10, signal connections 311 correspond to pins A2 and A3, signal connections 312 correspond to pins A11 and A10, signal connections 313 correspond to pins B2 and B3, signal connections 314 and 315 correspond to pins B6 and B7, signal connections 316, 317 correspond to pins A8 and B8, signal connection 318 corresponds to pin A5, signal connection 319 corresponds to pin B5, signal connections 320, 321 correspond to pins A6 and A7, signal connection 322 corresponds to four vbus power pins A4, B4, A9, and B9, signal connection 323 corresponds to four GND signal pins A1, B1, A12, and B12.

In certain embodiments, the first connector 240 is the USB3.1 Type-C connector and includes some or all of signals present on USB3.1 Type-C connector including alternate modes using a plurality of signal connections often including a first differential signal connection pair 310 (USB Type_C pins B11 and B10), and second differential signal connection pair 311 (USB Type-C pins A2 and A3), and third differential signal connection pair 312 (USB Type-C pins A11 and A10), and fourth differential signal connection pair 313 (USB Type-C pins B2 and B3), a first USB Type-C normally open pair signal connections 314, 315 (USB Type-C pins B6 and B7), a pair of sideband signal connections 316, 317 (SBU1, SBU2), a first USB Type-C cable power connection 318 (VCONN), a configuration channel signal connection 319 (CC), a USB2.0 differential pair signal connections 320, 321 (Dp, Dn on USB Type-C pins A6 and A7), four bus power signal connection 322 (Vbus) and four ground signal connection 323 (GND). In certain embodiments, the first connector 240 is designed to be insertion orientation agnostic (i.e., the connector will operationally transmit and receive the correct signals regardless of the orientation of the connector).

In certain embodiments, the first connector 240 includes a clock signal connection and a data signal connection. When the second connection portion comprises a USB Type-C connector, the clock signal connection corresponds to pin B6 and the signal connection corresponds to pin B7. Under the USB Type-C Specification for the cable, plug pins A6 and A7 carry USB2.0 signals Dp and Dm, and pins B6 and B7 are normally left open. The USB Type-C receptacle on the host or device routes USB2.0 signals to the receptacle pins that are connected to USB Type-C plug pins A6 and A7 on cable. Some hosts enabled with a transfer switch, or capable port controller, can switch the USB2.0 signals to the correct cable pins when orientation is flipped.

The second connection portion 246 includes some or all of signal connections for a first integrated I/O channel with two differential pair signals for each direction of communication connections 330, 331 (TBT TX0, TBT RX0), a second integrated I/O differential channel with two differential pair signals for each direction of communication connections 332, 333 (TBT RX1, TBT TX1), a USB Super Speed channel with two pairs of differential signal connections, one for each direction, 334, 335 (USB3 TX, USB3 RX), DisplayPort low speed signals comprising a hot plug detect (HPD) signal connection 336 and auxiliary pair (AUXP, AUXN) signal connections 337, 338, a Display Port Main Link Lane 0 differential pair signal connection 339 (ML0), a Display Port Main Link Lane 1 differential pair signal connection 340 (ML1), a Display Port Main Link Lane 2 differential pair signal connection 341 (ML2), a Display Port Main Link Lane 3 differential pair signal connection 342 (ML3), a pair of Low Speed Thunderbolt UART interface signal connection 343, 344 (LSTX, LSRX), a cable power source connection 345 (AP5V), an I2C data signal connection 346 (I2C DATA), an I2C clock signal connection 347 (I2C CLK), a configuration channel signal connection 348 (CC), a USB 2.0 connection differential pair signal connection 349, 350 (USB2 D+, USB2 D−), one or more ground signal connection(s) 352 (GND), and a host sense connection 353 (VCONN Host), one or more voltage bus signal connection 351 (VBUS), and an I2C alert signal connection 354 (I2C INT).

In various embodiments, the plurality of switches 260 includes a plurality of pairs of switches. In various embodiments, the plurality of pairs of switches include some or all of switch pair 360, switch pair 362, switch pair 364, switch pair 366.

Additionally, in certain embodiments, the cable portion 242 includes a switch pair 370. In certain embodiments, the switch pair 370 is located in close proximity to the first USB differential pair signal connections 314, 315. Additionally, in certain embodiments, the cable portion 242 includes a circuit element 372

Figure 4A:
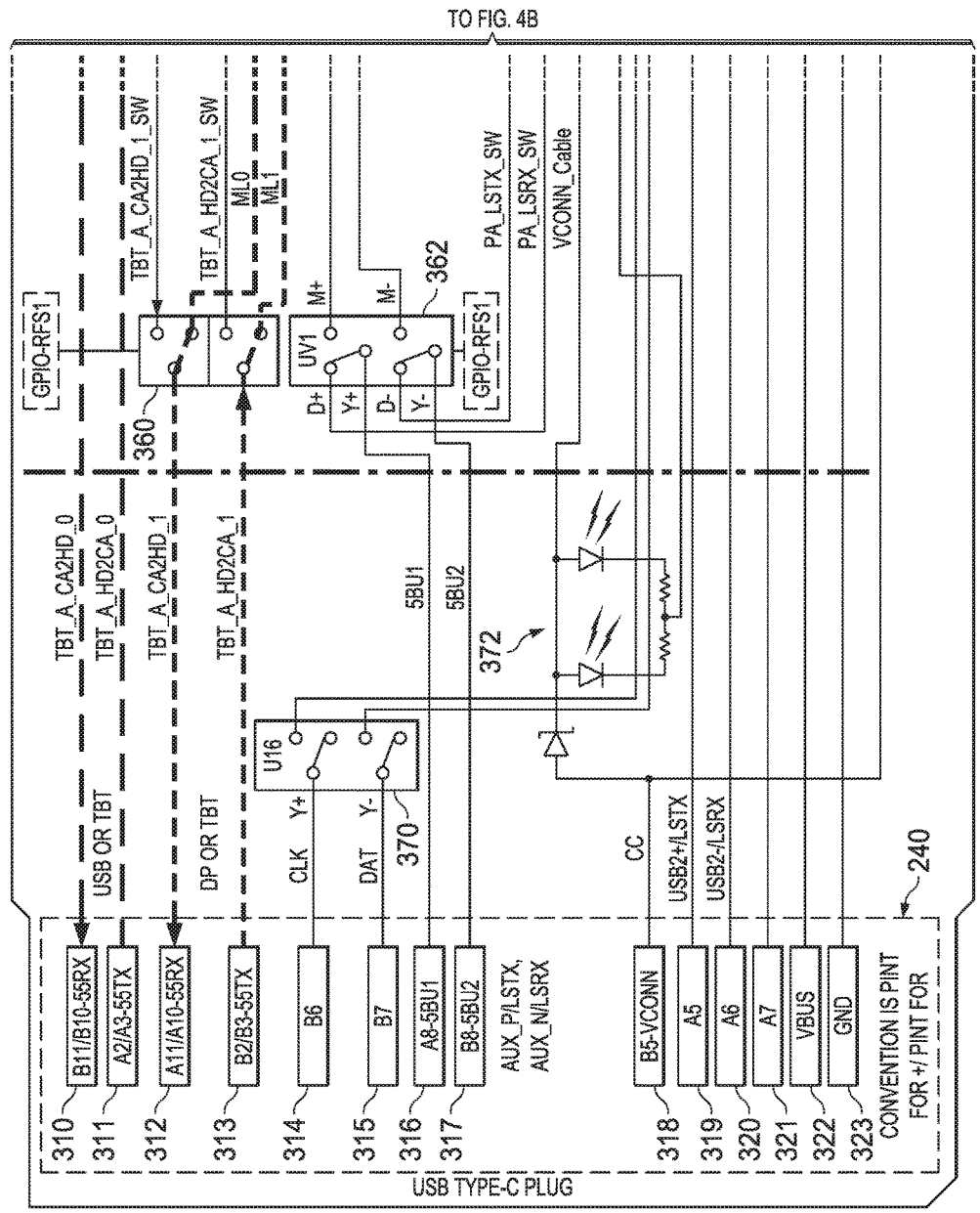
FIGS. 4A and 4B show a schematic block diagram of a multi-modal active cable with communication paths representing a first mode of operation.
Figure 4B:
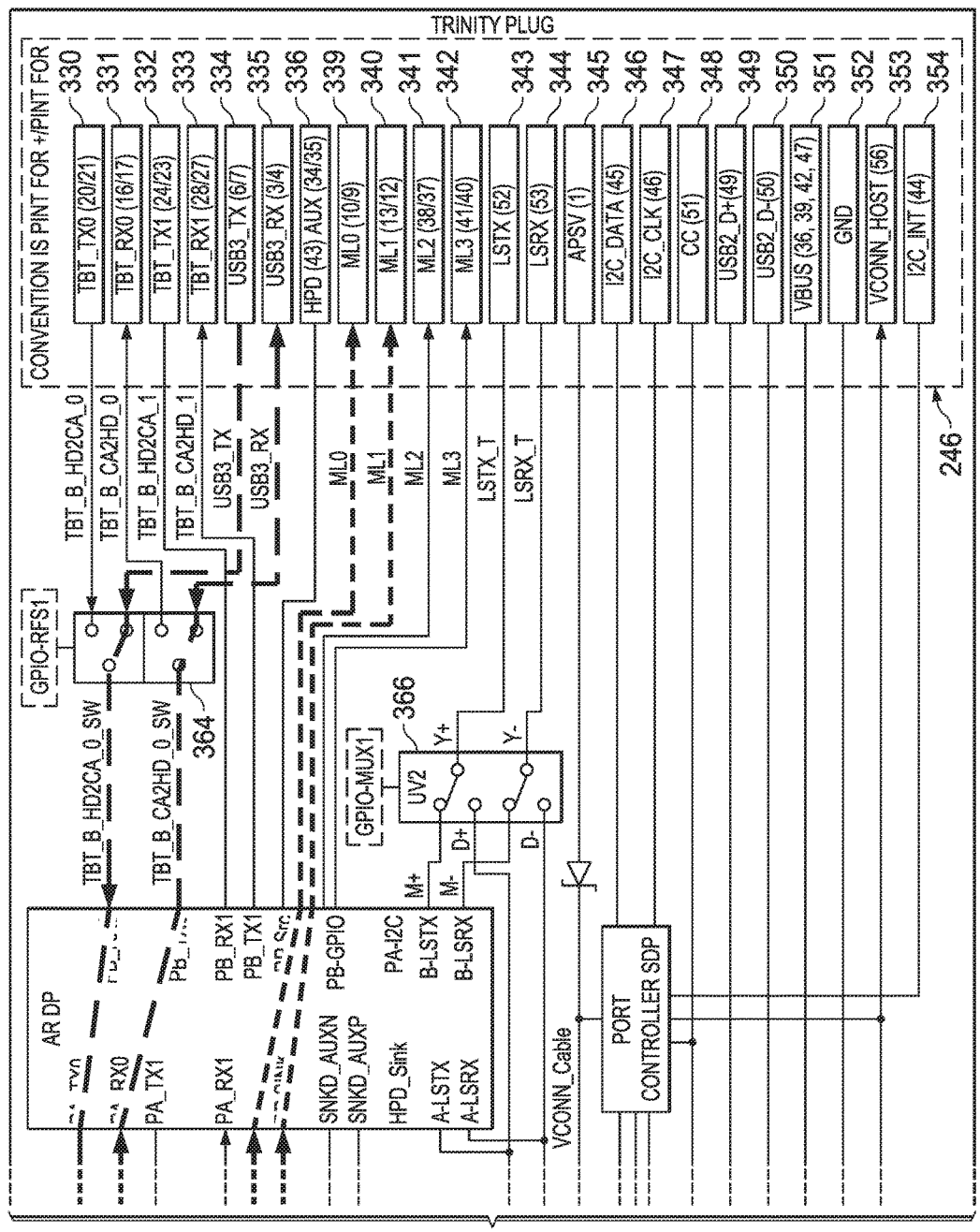

FIG. 4 shows a schematic block diagram of a multi-modal active cable with communication paths representing a first mode of operation. More specifically, when a non-Thunderbolt type host (e.g., a non-integrated I/O information handling system) is coupled to the USB Type-C connector 240 and a non-Thunderbolt type docking station or device is coupled to the I/O adapter connector 246, then the integrated I/O controller 250 and the switch pair 364 are configured to couple USB Super Speed signals from the first two differential pair signals connections 310, 311 with the USB Super Speed differential pair signals at 334, 335. The integrated I/O controller 250 and the switch pair 360 are configured to couple the second two differential pair signals connections 312, 313 with the Display Port Main Link Lane 0 signal connection 339 and the Display Port Main Link Lane 1 signal connection 340. In certain embodiments, this configuration is controlled by the docking station's embedded controller using the I2C connection to a USB PD port controller that has GPIO function within the cable. The GPIOs drive the switches and integrated I/O controller USB re-driver setting. The dock and host information handling system communicate over CC wire or I2C to determine this mode of operation is optimal match of capabilities. As will be appreciated by one skilled in the art, this mode of operation will also work similarly when I/O connection 246 is coupled to a Thunderbolt (integrated I/O type) docking station that is capable of accepting USB3.1 and Display Port signals on connections that are different than the Thunderbolt signal connections.

Figure 5A:
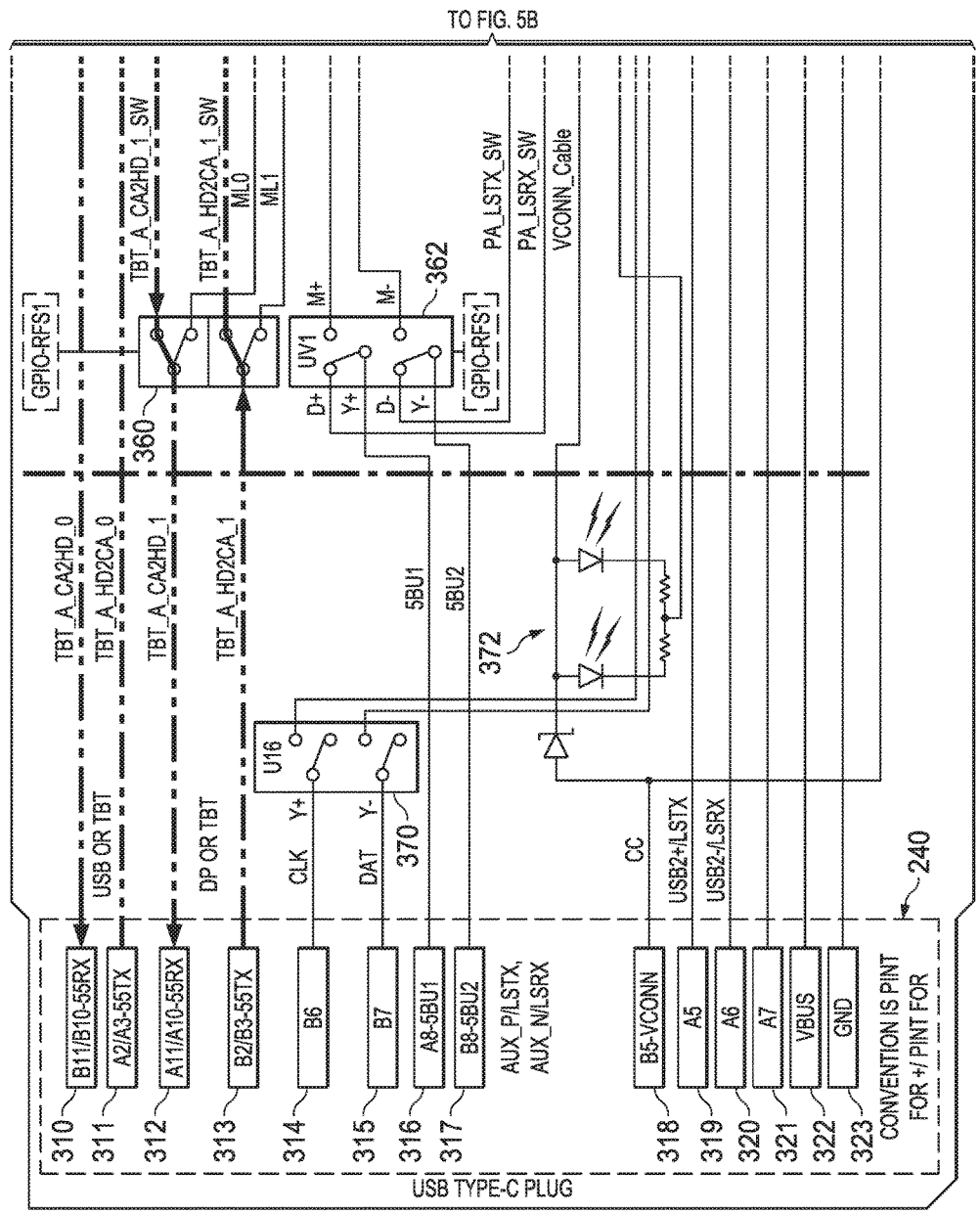
FIGS. 5A and 5B show a schematic block diagram of a multi-modal active cable with communication paths representing another mode of operation.
Figure 5B:
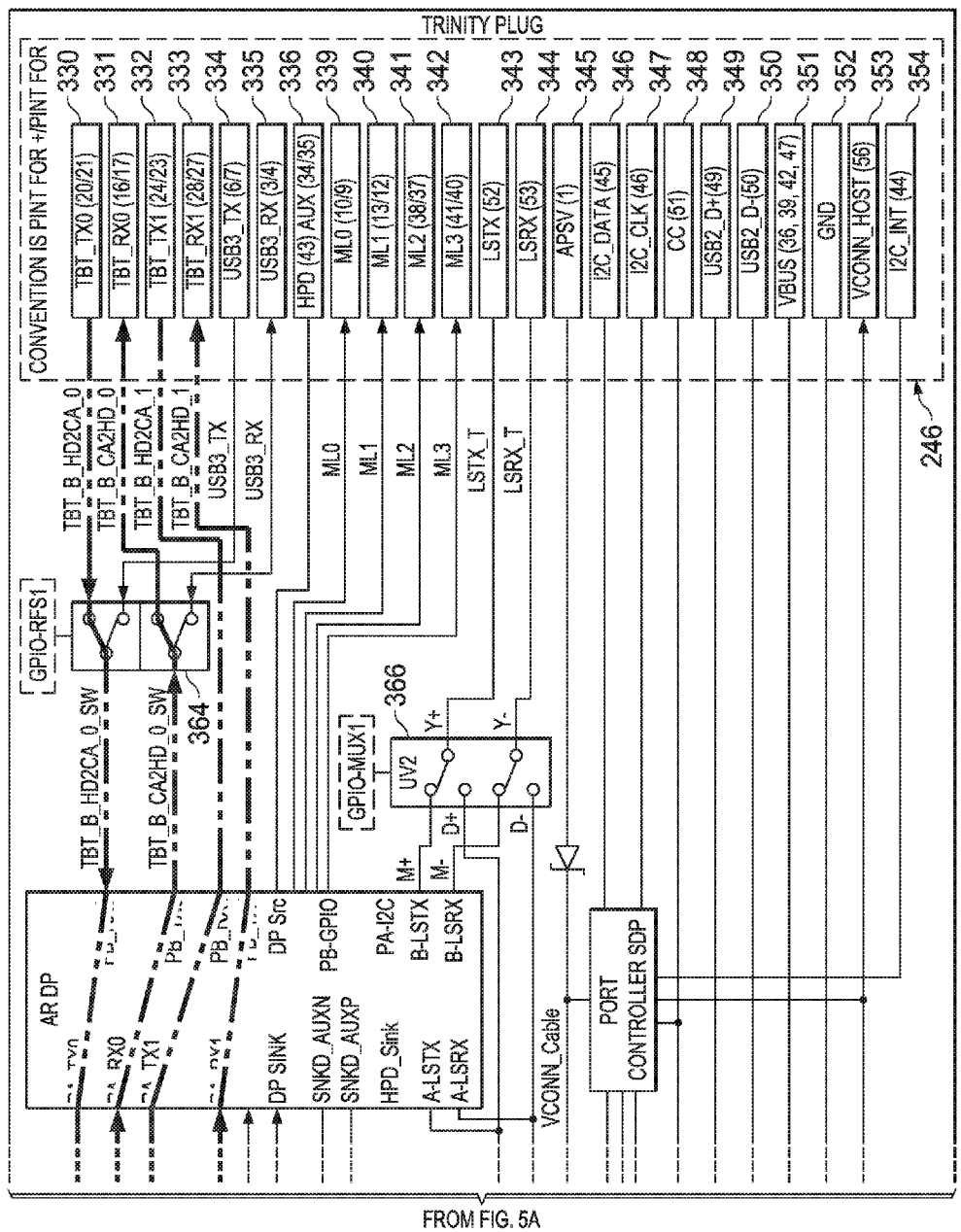

FIG. 5 shows a schematic block diagram of a multi-modal active cable with communication paths representing another mode of operation. More specifically, when a Thunderbolt type host (e.g., an integrated I/O type information handling system) is coupled to the USB Type-C connector 240 and a Thunderbolt type Docking station or device is coupled to the I/O adapter connector 246, then the integrated I/O controller 250 and the switch pair 364 are configured to couple the first two differential pairs of integrated I/O signals from the first two differential pair signals connections 310, 311 of the host with the first two integrated I/O differential pair signal connections 330, 331 of the dock. The integrated I/O controller 250 and switch pair 360 are configured to couple the second two differential pairs of integrated I/O signals from the second two differential pair signals connections 312, 314 of the host with the second two integrated I/O differential pair signals connections 332, 333 of the dock. In certain embodiments, this configuration is controlled by the docking station's embedded controller using the I2C connection to a USB PD port controller that has GPIO function within the cable. The GPIOs drive the switches and integrated I/O controller Thunderbolt re-driver setting. The dock and host information handling system communicate over CC wire or I2C to determine this mode of operation is optimal match of capabilities.

Figure 6A:
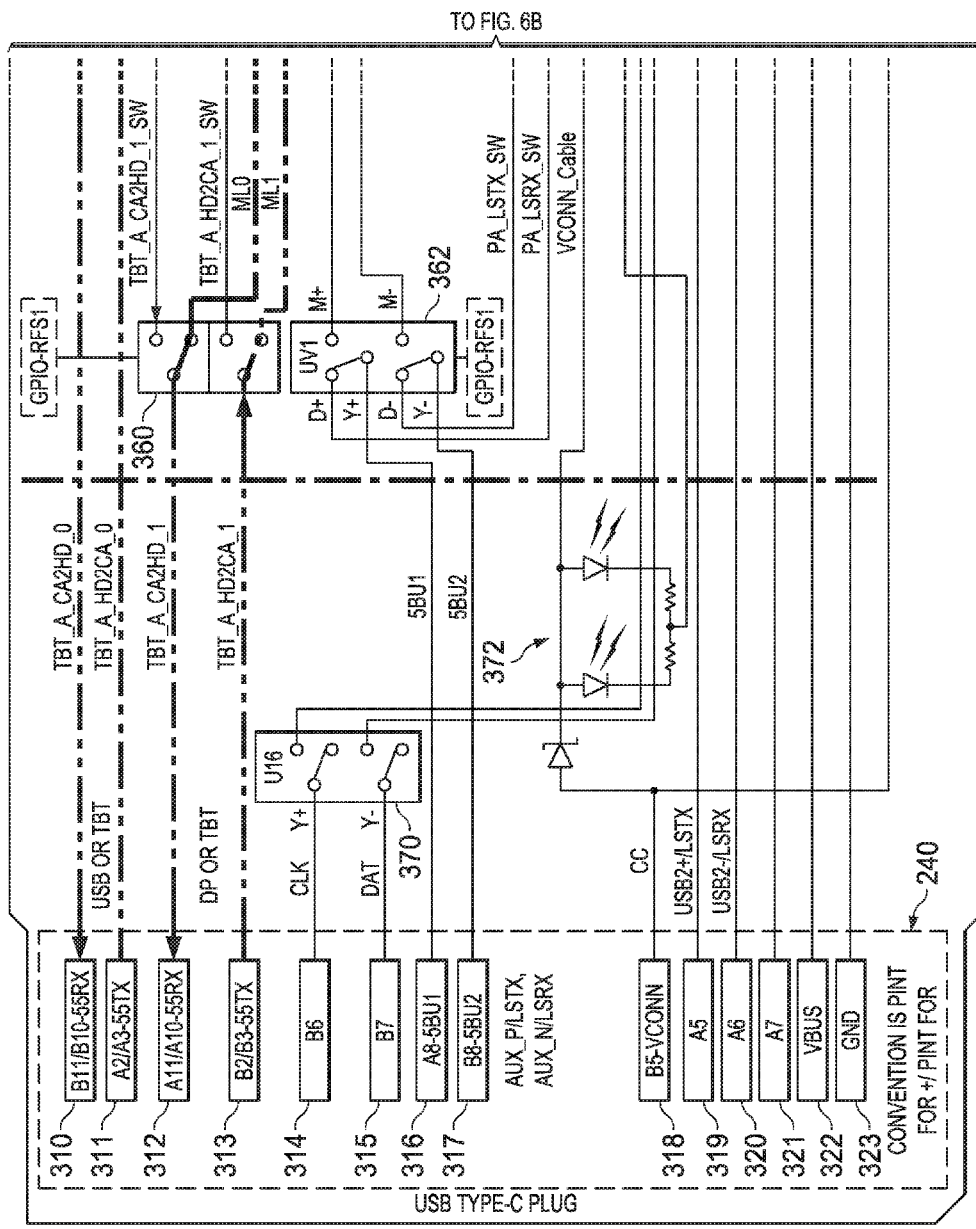
FIGS. 6A and 6B show a schematic block diagram of a multi-modal active cable with communication paths representing another mode of operation.
Figure 6B:
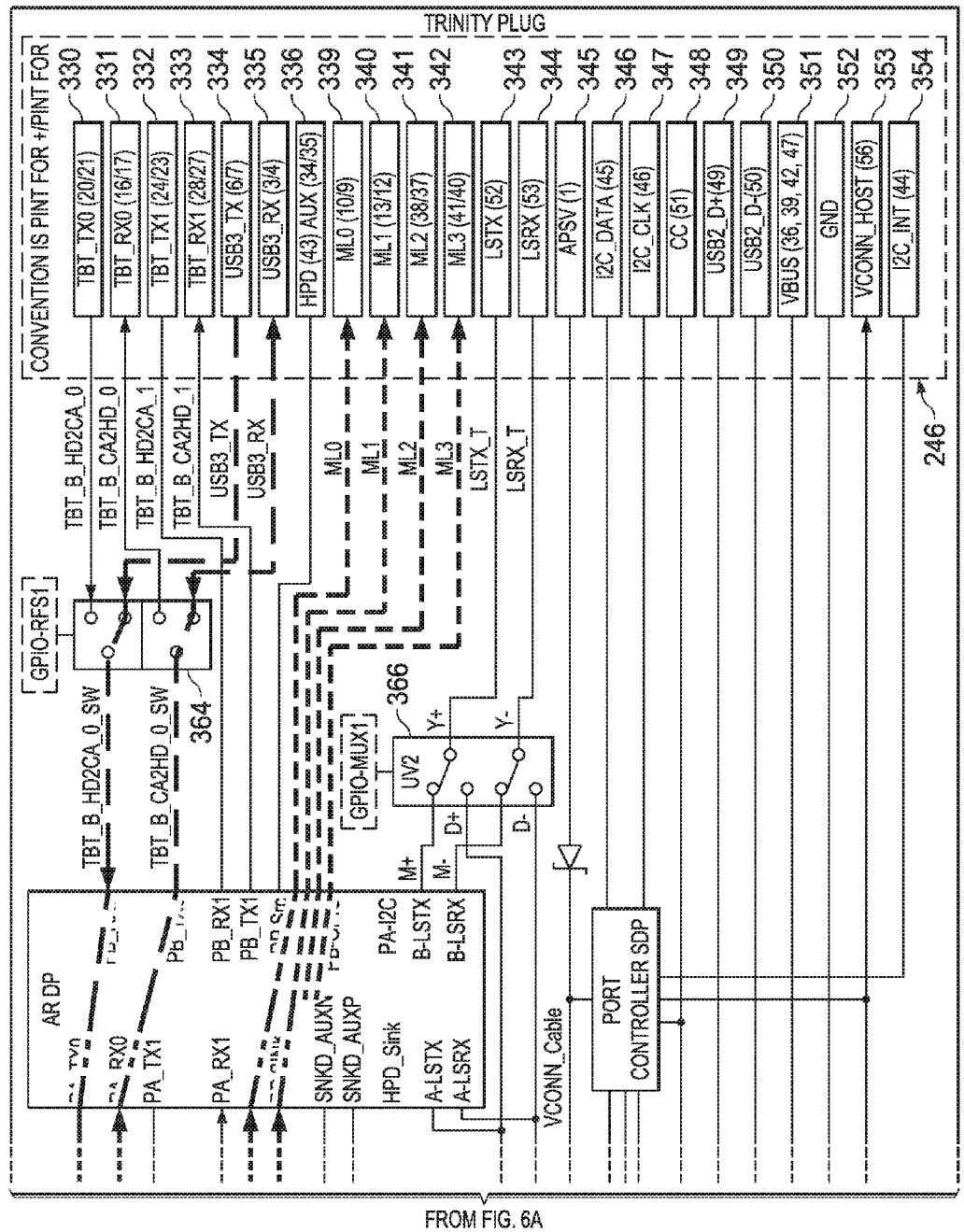

FIG. 6 shows a schematic block diagram of a multi-modal active cable with communication paths representing another mode of operation. More specifically, when a Thunderbolt type host (e.g., an integrated I/O type information handling system) is coupled to the USB Type-C connector 240 and a non-Thunderbolt type docking station or device is coupled to the I/O adapter connector 246, then switch pair 360 is configured to couple the differential pairs of integrated I/O signals 310, 311, 312, and 313 to the integrated I/O controller 250, and the integrated I/O controller 250 is placed in end point mode. The integrated I/O controller 250 is then able to provide connections from the host system for USB Super Speed differential pair signals 334 and 335, and four Lanes of Display Port signals 339, 340, 341, and 342. Switch pair 364 couples the integrated I/O port which is in USB Super Speed mode to the USB Super Speed differential pair signals 334, 336 of the dock. The integrated I/O controller 250 becomes the source for 4 lanes of Display Port which are coupled to the four differential pair signals connections Display Port Main Link Lane 0 signal connection 339, the Display Port Main Link Lane 1 signal connection 340, the Display Port Main Link Lane 2 signal connection 341 and the Display Port Main Link Lane 2 signal connection 342. In certain embodiments, this configuration is controlled by the docking station's embedded controller using the I2C connection to a USB PD port controller that has GPIO function within the cable. The GPIOs drive the switches and integrated I/O controller's end point setting. Such a mode of operation can support a high definition display device type such as a 4K×2K at 60 Hz ultra high definition display device being coupled to the I/O adapter, and USB 3.1 Gen 2 with 10 Gbps connection.

Figure 7A:
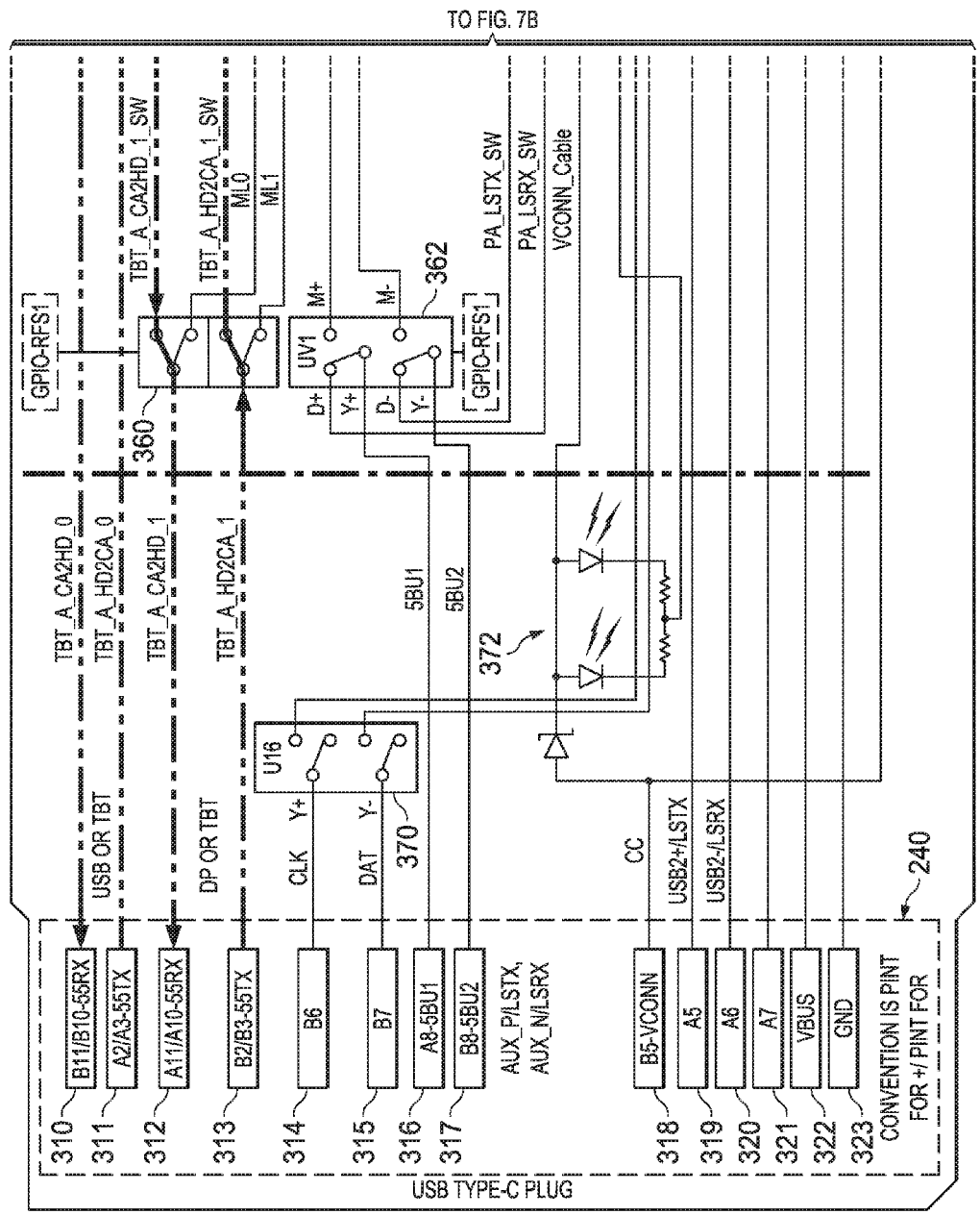
FIGS. 7A and 7B show a schematic block diagram of a multi-modal active cable with communication paths representing another mode of operation.
Figure 7B:
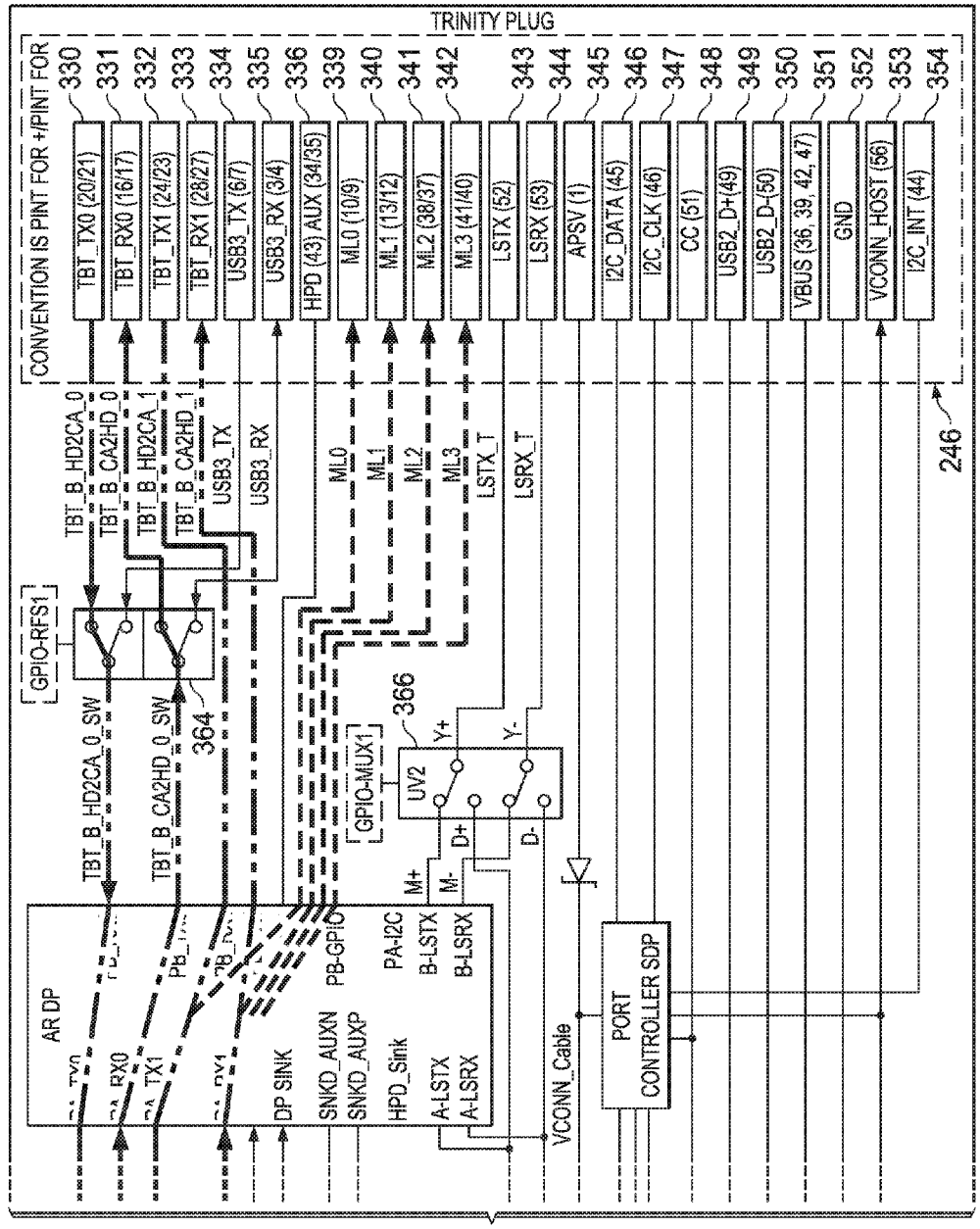

FIG. 7 shows a schematic block diagram of a multi-modal active cable with communication paths representing another mode of operation. More specifically, when a Thunderbolt type host (integrated I/O type information handling system) is coupled to the USB Type-C connector 240 and a Thunderbolt type docking station or device is coupled to the I/O adapter connector 246, then switch pair 360 is configured to couple the differential pairs of integrated I/O signals to the integrated I/O controller 250, and the integrated I/O controller 250 is placed in end point mode. The integrated I/O controller 250 is then able to provide connections from the host system for Thunderbolt (integrated I/O) and four Lanes of Display Port. Switch pair 364 couples the other I/O port of integrated I/O controller to the Thunderbolt (integrated I/O) differential pair signals 330, 331, 331, and 333. The integrated I/O controller 250 becomes the source for 4 lanes of Display Port which are coupled to the four differential pair signals connections Display Port Main Link Lane 0 signal connection 339, the Display Port Main Link Lane 1 signal connection 340, the Display Port Main Link Lane 2 signal connection 341 and the Display Port Main Link Lane 3 signal connection 342. In certain embodiments, this configuration is controlled by the docking station's embedded controller using the I2C connection to a USB PD port controller that has GPIO function within the cable. The GPIOs drive the switches and the integrated I/O controller's end point setting. Such a mode of operation can support an ultra high definition display device type such as a 4K×2K at 60 Hz, ultra high definition display device being coupled to the signals 330, 331, 332, and 333, as well as 40 Gbps Thunderbolt data rate between the Thunderbolt dock and integrated I/O controller 250 in the cable.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

As will be appreciated by one skilled in the art, in order to optimize the use of the present invention with standard host systems that have USB Type-C connector with either integrated I/O port (Thunderbolt) or multi-function display port (display port over USB Type-C) capability, the cable should identify itself using standard USB Type-C Power Delivery method as capable of both Integrated I/O alternate mode, or display port alternate mode. In certain embodiments, this identification is performed by listing both capabilities in vendor defined modes, or identifying itself as a passive cable which meets the signal integrity requirements of both Integrated I/O and display Port Alt mode. In certain embodiments, the cable may identify itself as a passive cable via an E-Marker such as a USB Type-C Port Controller identification which identifies the cable as a passive cable which is short enough to properly couple high speed integrated I/O (i.e., to couple the high speed integrated I/O without signal degradation), as well as dedicated display signals For the purpose of USB Org cable ID, this active cable may be considered as a passive cable with USB Type-C at one end, and captive at the other end.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example in certain embodiments some or all of the switches of the switching component may be integrated within the integrated I/O controller of the active cable. Also for example it will be appreciated that I/O adapters other than a docking station are contemplated. Also for example, it will be appreciated that the second connection portion may be directly connected to the I/O adapter or docking station.

Consequently, the invention is intended to be limited only by the spirit and scope of the appended claims, giving full cognizance to equivalents in all respects.

What is claimed is:
1. A multi-modal active cable comprising:
    a first connector;
    a second connection portion; and,
    a cable portion coupled between the first connector and the second connection portion, the cable portion comprising a plurality of integrated Input/Output (I/O) signal paths and a plurality of dedicated display signal paths and a power deliver signal path, the multi-modal active cable performing a mode identification operation via the power delivery signal path, the mode identification operation identifying a mode of operation of the multi-modal active cable; and wherein
    the mode identification operation is identified via one of a I2C signal and an identification signal.
2. The multi-modal active cable of claim 1, wherein:
    the plurality of integrated I/O signals comprise Thunderbolt integrated I/O signals; and, the plurality of dedicated display signals comprise DisplayPort signals.

3. The multi-modal active cable of claim 2, wherein:
the first connector comprises a USB Type-C connector, the USB Type-C connector comprising USB Type-C signal connections; and,
the second connection portion comprises a connector other than a USB Type-C connector.

4. The multi-modal active cable of claim 3, wherein:
the multi-modal active cable uses USB power delivery on a USB Type-C connector to uniquely identify capabilities of the multi-modal active cable.

5. The multi-modal active cable of claim 4, wherein:
the capabilities of the multi-modal active cable comprise at least one of support of a plurality of lanes of integrated I/O signals and a plurality of lanes of dedicated display signals having associated USB signals.

6. A multi-modal active cable comprising:
a first connector;
a second connection portion; and,
a cable portion coupled between the first connector and the second connection portion, the cable portion comprising a plurality of integrated Input/Output (I/O) signal paths and a plurality of dedicated display signal paths and a power deliver signal path, the multi-modal active cable performing a mode identification operation via the power delivery signal path, the mode identification operation identifying a mode of operation of the multi-modal active cable; and wherein:
a passive cable indication identifies the multi-modal cable as a passive cable which is short enough to couple high speed integrated I/O, as well as dedicated display signals.

7. A multi-modal active cable comprising:
a first connector;
a second connection portion; and,
a cable portion coupled between the first connector and the second connection portion, the cable portion comprising a plurality of integrated Input/Output (I/O) signal paths and a plurality of dedicated display signal paths and a power deliver signal path, the multi-modal active cable performing a mode identification operation via the power delivery signal path, the mode identification operation identifying a mode of operation of the multi-modal active cable; and
an active cable port controller, the mode identification operation comprising generating a capabilities message via an E-Marker generated by the active cable port controller.

* * * * *